United States Patent
Straussberger et al.

(10) Patent No.: US 10,688,423 B2
(45) Date of Patent: Jun. 23, 2020

(54) FILTER LEAK PATH PREVENTION VIA INTERFERENCE PIN

(71) Applicant: Cummins Filtration IP, Inc., Columbus, IN (US)

(72) Inventors: Mark D. Straussberger, Algood, TN (US); Pravin S. Kadam, Kolhapur (IN); Wassem Abdalla, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 261 days.

(21) Appl. No.: 15/537,525

(22) PCT Filed: Dec. 10, 2015

(86) PCT No.: PCT/US2015/064972
§ 371 (c)(1),
(2) Date: Jun. 19, 2017

(87) PCT Pub. No.: WO2016/105963
PCT Pub. Date: Jun. 30, 2016

(65) Prior Publication Data
US 2018/0001238 A1    Jan. 4, 2018

Related U.S. Application Data

(60) Provisional application No. 62/095,227, filed on Dec. 22, 2014.

(51) Int. Cl.
*B01D 35/153* (2006.01)
*B01D 29/96* (2006.01)
(Continued)

(52) U.S. Cl.
CPC .......... *B01D 35/153* (2013.01); *B01D 29/11* (2013.01); *B01D 29/114* (2013.01); *B01D 29/96* (2013.01);
(Continued)

(58) Field of Classification Search
CPC ........ F02M 37/22; F02M 37/24; F02M 37/26; F02M 37/28; F02M 37/32; F02M 37/34;
(Continued)

(56) References Cited

U.S. PATENT DOCUMENTS

| 2,347,384 A | * | 4/1944 | Winslow | ............... | B01D 27/02 |
| | | | | | 210/458 |
| 3,448,011 A | * | 6/1969 | Russomanno | ......... | B01D 29/96 |
| | | | | | 435/297.5 |

(Continued)

OTHER PUBLICATIONS

International Search Report and Written Opinion issued for PCT/US2015/064972, dated Apr. 7, 2016, 16 pages.

*Primary Examiner* — David C Mellon
(74) *Attorney, Agent, or Firm* — Foley & Lardner LLP

(57) ABSTRACT

A replacement filter element having a removable pin attached to the filter element is described. The removable pin is attached to the filter element via a first interference fit. When the replacement filter element is installed into a filtration system having a drain valve with an internal draft, the removable pin seals onto the drain valve and forms a second interference fit between the drain valve and the pin. The pin seals an opening in the drain valve. The second interference fit is stronger than the first interference. Accordingly, when the replacement filter element is removed from the filter housing (e.g., during a service event of the replacement filter element), the pin detaches from the replacement filter element and remains positioned within the drain valve thereby preventing fluid from leaking from the housing (Continued)

when the filter element is removed. The pin permanently plugs the drain valve once installed.

6 Claims, 7 Drawing Sheets

(51) Int. Cl.
    *B01D 36/00*         (2006.01)
    *B01D 35/16*         (2006.01)
    *B01D 29/11*         (2006.01)

(52) U.S. Cl.
    CPC ........... *B01D 35/16* (2013.01); *B01D 36/005* (2013.01); *B01D 36/006* (2013.01); *B01D 2201/291* (2013.01); *B01D 2201/295* (2013.01); *B01D 2201/347* (2013.01); *B01D 2201/4046* (2013.01)

(58) Field of Classification Search
    CPC .... F02M 37/36; F02M 37/42; B01D 2201/16; B01D 2201/162; B01D 2201/30; B01D 2201/301; B01D 2201/304; B01D 2201/305; B01D 2201/306; B01D 2201/40; B01D 2201/4046; B01D 35/005; B01D 35/14; B01D 35/16; B01D 35/153; B01D 27/08; B01D 27/10; B01D 27/103; B01D 27/106; B01D 27/108; B01D 29/11; B01D 36/006; B01D 29/96; B01D 2201/291; B01D 29/114; B01D 36/005; B01D 2201/347; B01D 2201/295
    See application file for complete search history.

(56) References Cited

U.S. PATENT DOCUMENTS

| | | | |
|---|---|---|---|
| 5,695,636 A * | 12/1997 | Gullett | B01D 29/21 210/232 |
| 6,884,349 B1 | 4/2005 | Jiang | |
| 2007/0170101 A1 | 7/2007 | Stanhope et al. | |
| 2008/0035121 A1 * | 2/2008 | Wieczorek | F02M 37/20 123/516 |
| 2013/0306540 A1 | 11/2013 | Thomas et al. | |
| 2013/0319930 A1 | 12/2013 | Rauznitz et al. | |
| 2014/0021119 A1 | 1/2014 | Malgorn et al. | |

* cited by examiner

FILTER LEAK PATH PREVENTION VIA INTERFERENCE PIN

CROSS REFERENCE TO RELATED APPLICATIONS

This application is a National Stage of PCT Application No. PCT/US2015/064972, filed Dec. 10, 2015, which claims priority to and benefit of U.S. Provisional Patent Application No. 62/095,227, "FILTER LEAK PATH PREVENTION VIA INTERFERENCE PIN," and filed on Dec. 22, 2014. The contents of both applications are herein incorporated by reference in their entirety and for all purposes.

TECHNICAL FIELD

The present disclosure relates generally to filtration systems having a replaceable filter element.

BACKGROUND

Internal combustion engines generally combust a mixture of fuel (e.g., gasoline, diesel, natural gas, etc.) and air. Prior to entering the engine, the intake air, fuel, and other fluids are typically passed through filtration systems to remove contaminants from the fluids (e.g., dust, water, oil, etc.) from the fluids. The filter elements require periodic replacement as the filter media of the filter elements captures and removes contaminants from the fluids passing through the filter media. In some cases, certain measures are taken by original filtration system manufacturers to ensure that only one brand of replacement filter elements are used. These measures include the inclusion of no filter no run features (also referred to as "NFNR" features) in filtration systems. The no filter no run features are designed such that the filtration system will only run properly with a genuine filter element. The use of a non-genuine replacement filter element may affect the operation of the filtration system despite the fact that the quality of the replacement filter element will provide the necessary protection to the internal combustion engine.

SUMMARY

One example embodiment relates to a replacement filter element. The filter element includes filter media and a bottom endcap. A removable pin is coupled to the bottom endcap via a first interference fit. The removable pin is sized and shaped to be received in an open passageway of a drain valve of a filtration system when the replacement filter element is installed in the filtration system. The removable pin forms a second interference fit with the drain valve when the replacement filter element is installed in the filtration system such that the removable pin will stay in the drain valve when the replacement filter element is removed from the filtration system.

Another example embodiment relates to a filtration system. The filtration system includes a mounting head, a filter housing removably coupled to the mounting head, and a drain valve coupled to the filter housing. The drain valve includes an open passageway that allows fluid to exit the housing through the drain valve when the open passageway is not blocked by a genuine element installed in the filtration system. The filtration system further includes a replacement filter element having filter media, an endcap, and a removable pin coupled to the endcap via a first interference fit. The removable pin is sized and shaped to be received in the open passageway of the drain valve when the replacement filter element is installed in the filtration system. The removable pin forms a second interference fit with the drain valve when the replacement filter element is installed in the filtration system such that the removable pin will separate from the endcap and remain in the drain valve when the replacement filter element is removed from the filtration system.

A further example embodiment relates to a method of servicing a filtration system having a no filter no run feature. The method includes providing a filtration system having a drain valve including the no filter no run feature. The no filter no run feature includes an open passageway that allows fluid to exit the housing through the drain valve when the open passageway is not blocked by a genuine element installed in the filtration system. The method further includes providing a replacement filter element including filter media, an endcap, and a removable pin coupled to the endcap via a first interference fit. The method includes installing the replacement filter element in the filtration system such that the removable pin is inserted into the open passageway and forms a second interference fit with the open passageway thereby plugging the open passageway.

These and other features, together with the organization and manner of operation thereof, will become apparent from the following detailed description when taken in conjunction with the accompanying drawings.

DETAILED DESCRIPTION

Referring to the figures generally, a replacement filter element having a removable pin attached to the filter element is described. The removable pin is attached to the filter element via a first interference fit. When the replacement filter element is installed into a filtration system having a drain valve with an internal draft, the removable pin seals onto the drain valve and forms a second interference fit between the drain valve and the pin. The pin seals an opening in the drain valve. The second interference fit formed between the drain valve and the pin is stronger than the first interference fit formed between the pin and the replacement filter element. Accordingly, when the replacement filter element is removed from the filter housing (e.g., during a service event of the replacement filter element), the pin detaches from the replacement filter element and remains positioned within the drain valve thereby preventing fluid from leaking from the housing when the filter element is removed. The pin permanently plugs the drain valve once installed.

Figure 1:
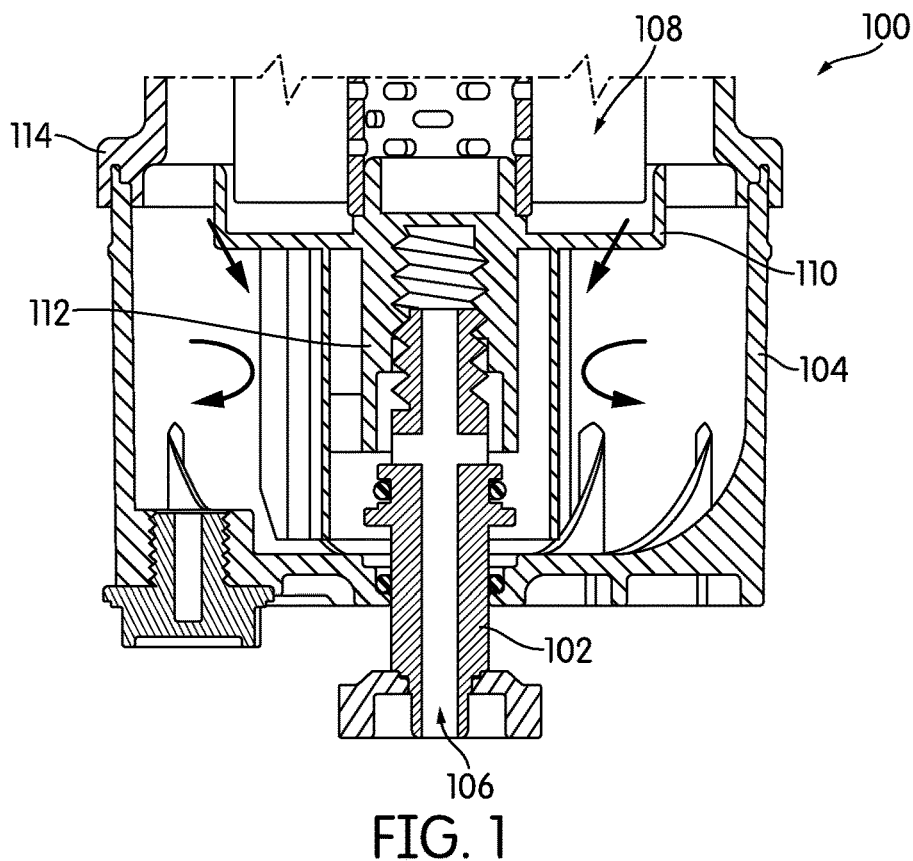
FIG. 1 is a cross-sectional view of a filtration system according to an exemplary embodiment.

Referring to FIG. 1, a cross-sectional view of a filtration system 100 is shown according to an exemplary embodiment. The filtration system 100 includes a no filter no run feature built into a drain valve 102 of the filter housing 104. The filter housing 104 is removably coupled to a filter system mounting head 114 (e.g., via a threaded connection). The no filter no run feature in the drain valve 102 includes an open passageway 106 that allows fluid (e.g., fuel, oil, etc.) to exit the housing 104 through the drain valve 102 when the open passageway 106 is not blocked by a genuine filter element. As shown in FIG. 1, a genuine filter element 108 is positioned within the housing 104. The genuine filter element 108 includes a bottom endcap 110. The bottom endcap 110 includes a cover 112 that closes the open passageway 106 of the drain valve 102. Accordingly, when the genuine filter element 108 is installed in the housing 104, the fluid cannot exit the housing 104 through the drain valve 102. A non-genuine filter element does not include the bottom endcap 110 having the cover 112. Accordingly, the use of a non-genuine filter element does not stop fluid from exiting the housing 104 through the drain valve 102.

Figure 2:
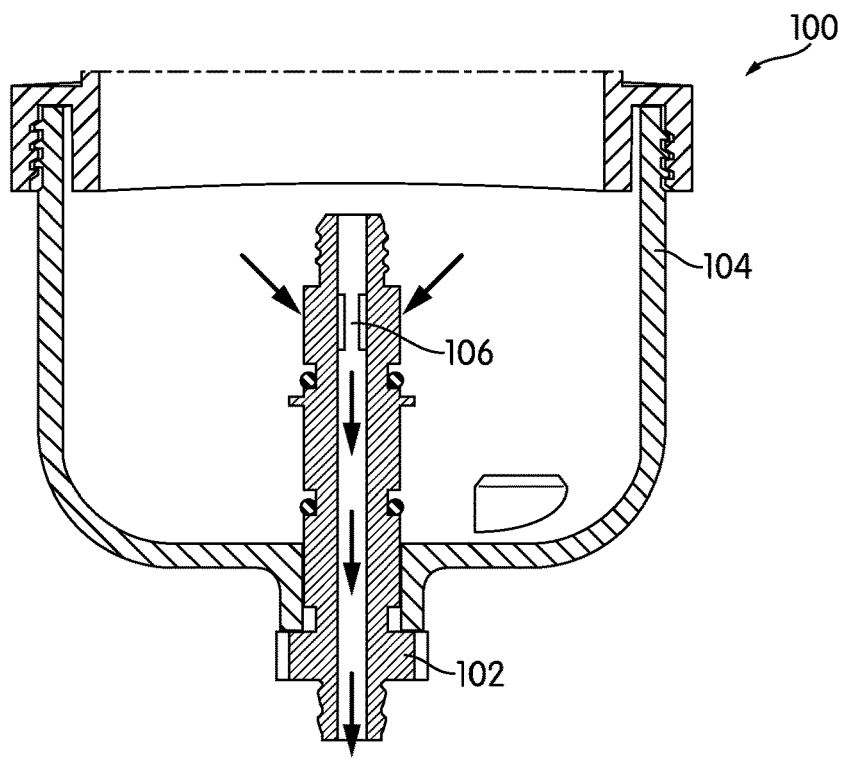
FIG. 2 is a cross-sectional view of the filtration system of FIG. 1 without a filter element installed.

Referring to FIG. 2, a cross-sectional view of the filtration system 100 is shown without a filter element installed. As shown in FIG. 2, when no filter element is installed (or when a non-genuine filter element is installed), the fluid can exit the housing 104 through the drain valve because the open passageway 106 is not plugged.

Figure 3A:
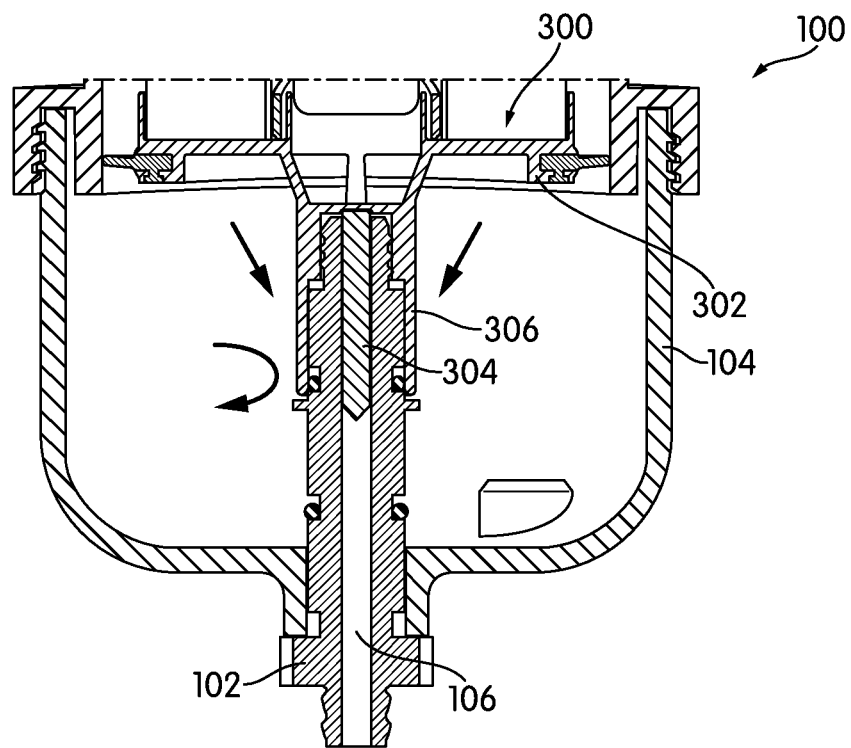
FIGS. 3A and 3B are cross-sectional views of the filtration system of FIG. 1 having a replacement filter element installed.
Figure 3B:
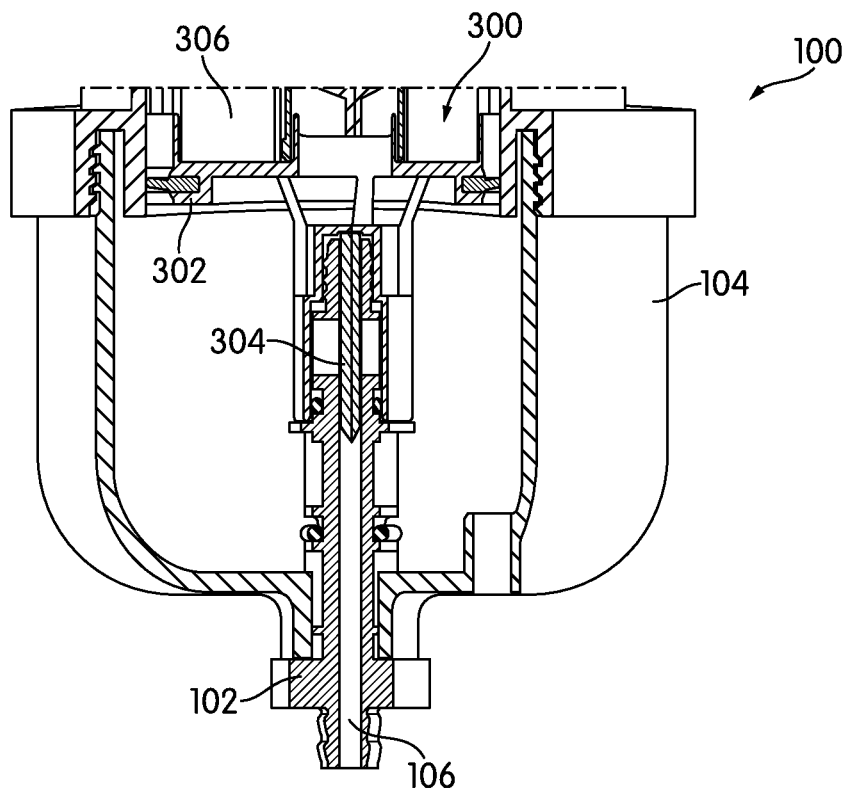

Referring to FIGS. 3A and 3B, cross-sectional views of the filtration system 100 having a replacement filter element 300 installed are shown. The replacement filter element 300 includes a bottom endcap 302 and a removable pin 304. The replacement filter element 300 also includes filter media 306. The removable pin 304 is secured to the bottom endcap 302 by a first interference fit. The removable pin 304 is sized and shaped to be received in the open passageway 106 of the drain valve 102. When the replacement filter element 300 is installed in the housing 104, the removable pin 304 is received in the open passageway 106 and forms a second interference fit with the open passageway 106 such that the removable pin 304 seals and plugs the open passageway 106. Accordingly, the removable pin 304 prevents fluid from draining through the drain valve 102. The second interference fit is stronger than the first interference fit. Accordingly, when the replacement filter element 300 is removed from the filtration system, the removable pin 304 remains in the open passageway 106 and continues to plug the open passageway 106 after removal of the replacement filter element 300.

The bottom endcap 302 includes a cylindrical extension 306 extending from the bottom endcap 302. The cylindrical extension 306 is shown best in FIG. 5. The cylindrical extension 306 includes a cylindrical wall 502 that defines a central opening. The removable pin 304 is positioned within the central opening. The cylindrical wall 502 at least partially circumscribes the removable pin 304. The removable pin 304 and the cylindrical extension 306 are axially aligned along a central axis 504 of the filter element 300. The cylindrical extension 306 is configured to fit around the drain valve 102, which helps to center the removable pin 304 with respect to the open passageway 106 during installation of the filter element 300 (as shown in FIGS. 6A through 6C).

Figure 4:
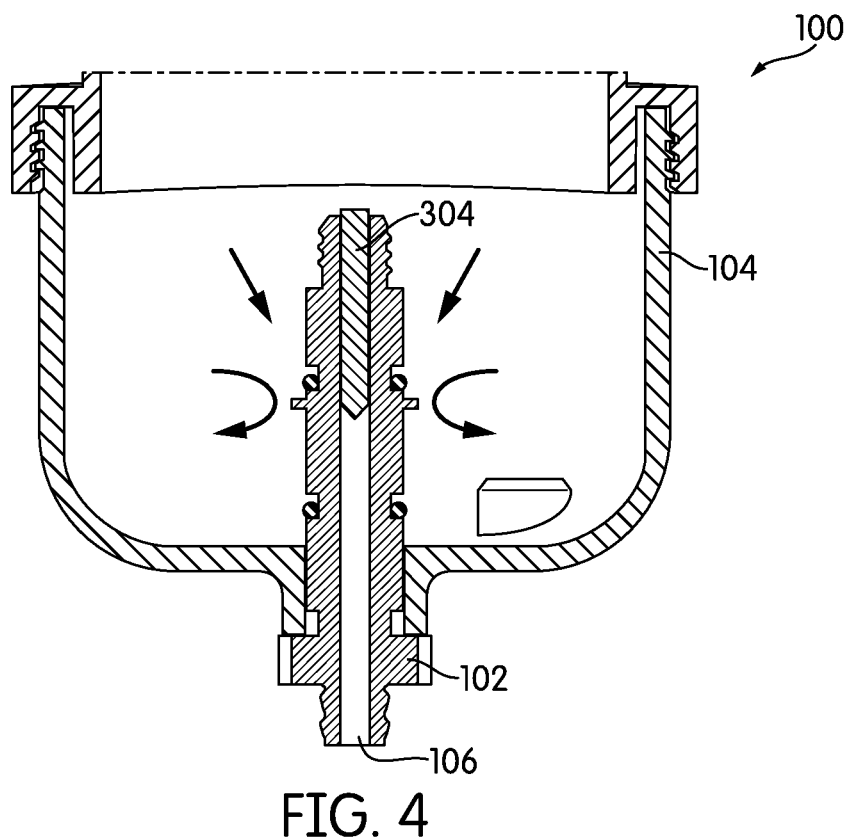
FIG. 4 is a cross-sectional view of the filtration system of FIG. 1 with the replacement filter element of FIGS. 3A and 3B removed.

Referring to FIG. 4, a cross-sectional view of the filtration system 100 with the replacement filter element 300 removed is shown. As shown in FIG. 4, when the replacement filter element 300 is removed, the pin 304 remains installed in the open passageway 106. The pin 304 breaks away from the filter element because the second interference fit is stronger than the first interference fit. The pin 304 will remain permanently attached within the drain valve 102. Accordingly, the pin 304 prevents fluid from leaking from the housing 104 even when a filter element is not installed in the housing. Further, the pin 304 permits the use of other non-genuine filter elements that are not designed to plug the open passageway 106.

Figure 5:
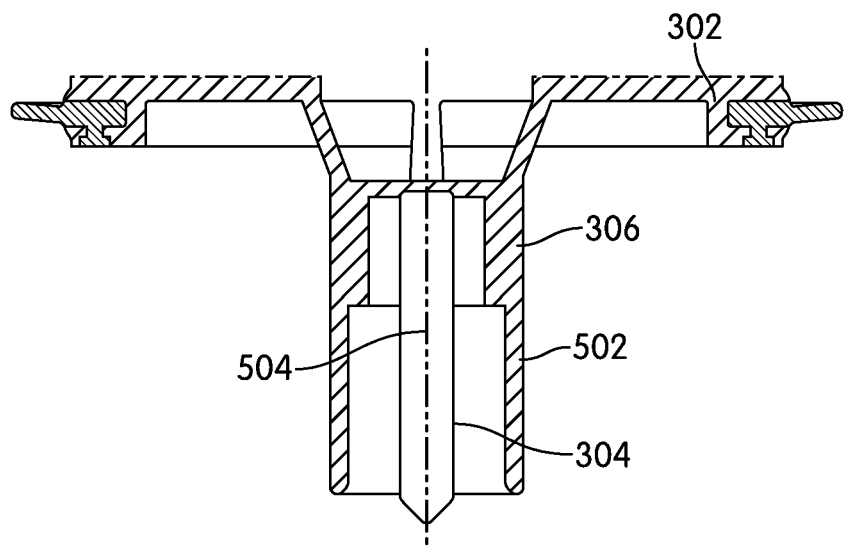
FIG. 5 is a cross-sectional view of the bottom endcap of the replacement filter element of FIGS. 3A and 3B.

Referring to FIG. 5, a cross-sectional view of the bottom endcap 302 is shown. As discussed above, the bottom endcap 302 includes the removable pin 304. The removable pin 304 is secured to the bottom endcap 302 through an interference fit.

Figure 6A:
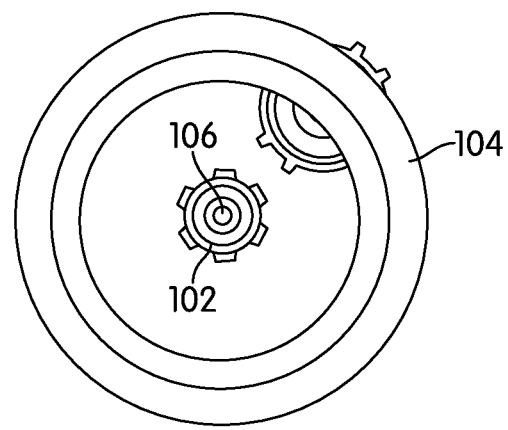
FIGS. 6A through 6C are a sequence of drawings showing a first fit with the replacement filter element of FIGS. 3A and 3B in filtration system of FIG. 1.
Figure 6B:
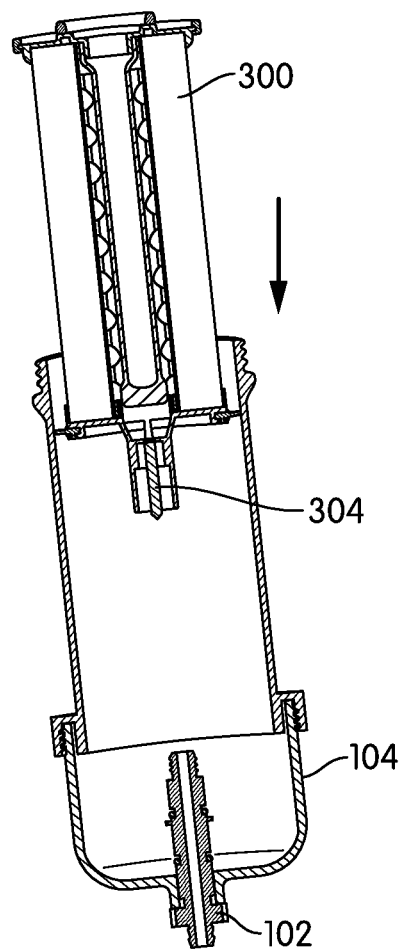
Figure 6C:
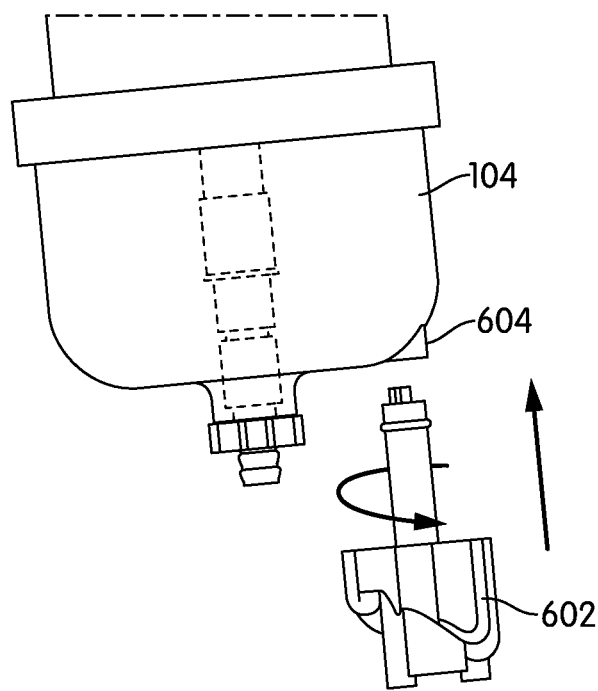

Referring to FIGS. 6A-6C, a sequence of drawings showing a first fit with the replacement filter element 300 in filtration system 100 is shown from the perspective of a technician servicing the filtration system 100. First, the technician inspects the filter housing 104 and determines that the open passageway 106 of the drain valve 102 is not plugged (e.g., as shown in FIG. 6A). Next, the technician installs the replacement filter element 300 into the housing 104 (e.g., as shown in FIG. 6B). The replacement filter element 300 includes the removable pin 304, which will plug the open passageway 106 when the filter element 300 is fully installed within the housing 104. In some arrangements, the technician installs a new drain valve 602 into an opening 604 within the housing 104. The new drain valve 602 may include a water in fuel (WIF) sensor. The filtration system 100 is then ready for operation.

Figure 7A:
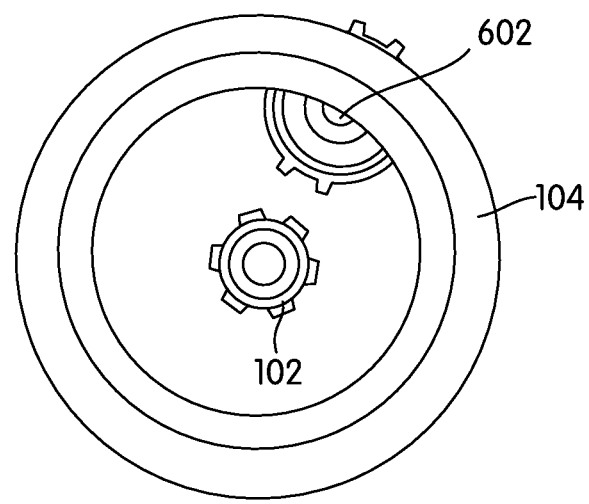
FIGS. 7A through 7C are a sequence of drawings showing a filter replacement service after the first fit of FIGS. 6A through 6B for the filtration system of FIG. 1.
Figure 7B:
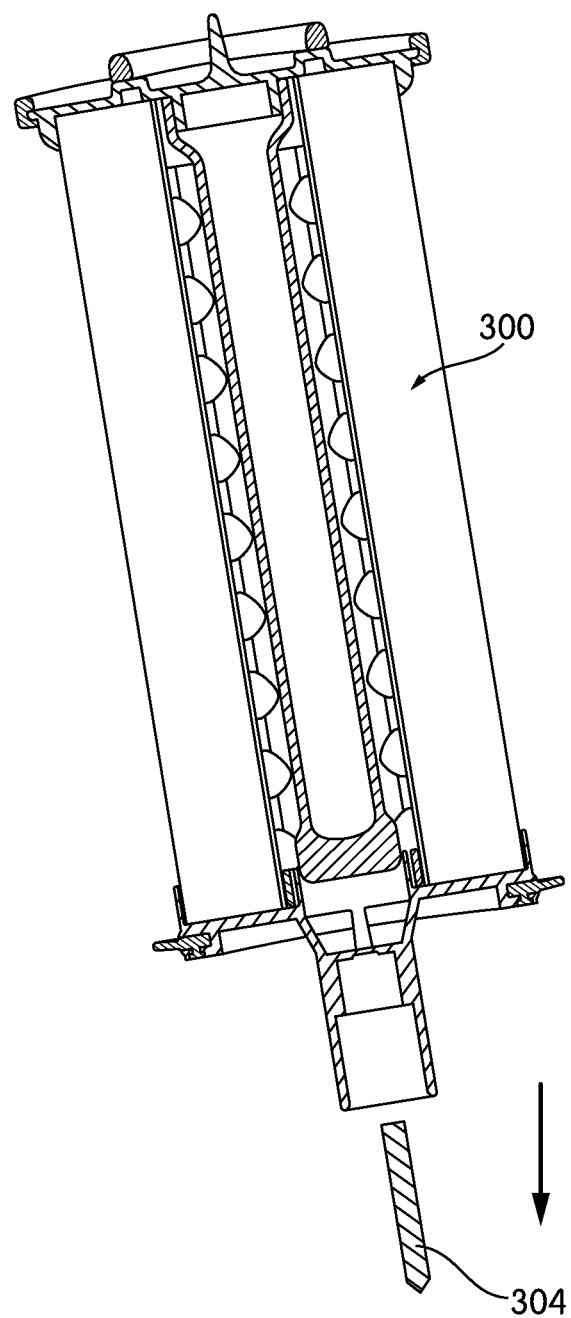
Figure 7C:
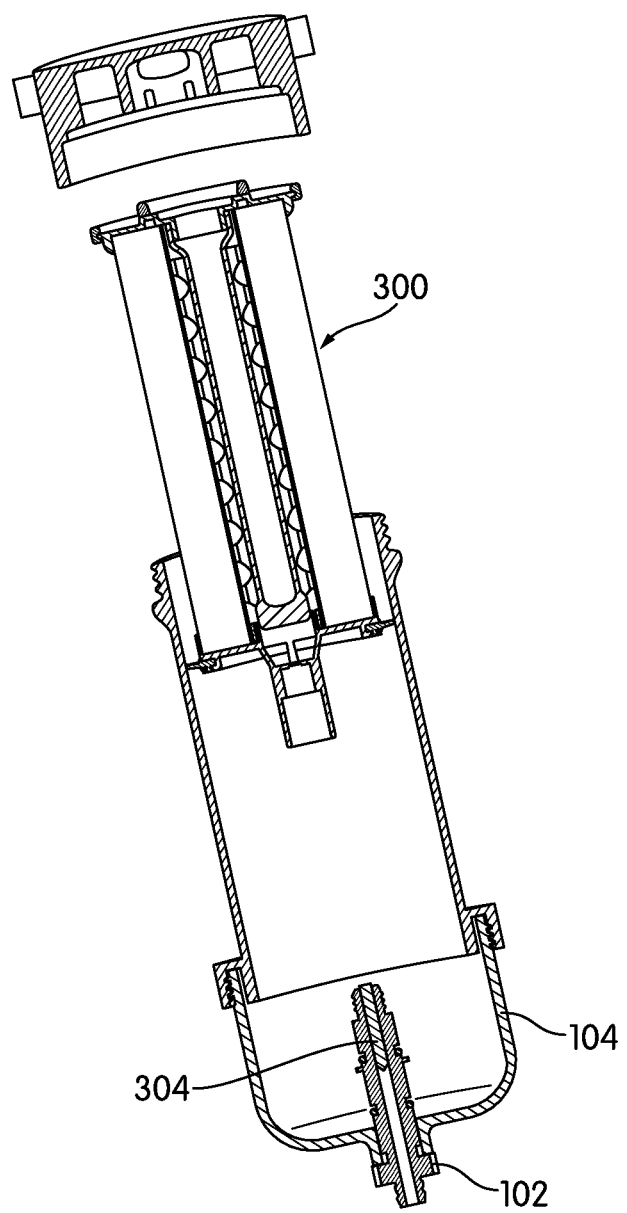

FIGS. 7A-7C represent a sequence of drawings showing a filter replacement service after the first fit (e.g., as described above with respect to FIGS. 6A-6C). In the filter replacement service, the old replacement filter element 300 is removed. The technician inspects the filter housing 104 to verify that the open passageway of the drain valve 102 is already plugged by the existing pin 304 (e.g., the open passageway 106 is not visible in FIG. 7A because it is plugged). Next, prior to installation of a new replacement filter element 300, the technician removes the pin 304 from the replacement filter element 300 (e.g., as shown in FIG. 7B). The pin 304 is held in place by an interference fit, and the pin 304 is removable. The replacement filter element 300 is then installed in the housing 104 without the pin 304 (e.g., as shown in FIG. 7C).

The permanent placement of the pin 304 within the open passageway 106 allows the filtration system 100 to accept other filter elements not having the appropriate features to interact with the original no filter no run features of the filtration system 100.

It should be noted that the terms "example" and "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filtration system comprising:
a mounting head;
a filter housing removably coupled to the mounting head;
a drain valve coupled to the filter housing, the drain valve including an open passageway that allows fluid to exit the housing through the drain valve when the open passageway is not blocked by a genuine element installed in the filtration system; and
a replacement filter element having filter media, an endcap, and a removable pin coupled to the endcap via a first interference fit, the removable pin sized and shaped to be received in the open passageway of the drain valve when the replacement filter element is installed in the filtration system, the removable pin forming a second interference fit with the drain valve when the replacement filter element is installed in the filtration system such that the removable pin will separate from the endcap and remain in the drain valve when the replacement filter element is removed from the filtration system.

2. The filtration system of claim 1, wherein the second interference fit is stronger than the first interference fit.

3. The filtration system of claim 1, wherein the endcap further comprises a cylindrical extension extending from the endcap.

4. The filtration system of claim 3, wherein the cylindrical extension includes a cylindrical wall that defines a central opening.

5. The filtration system of claim 4, wherein the removable pin is positioned within the central opening.

6. The filtration system of claim 4, wherein the cylindrical wall at least partially circumscribes the removable pin.

* * * * *